United States Patent [19]

Lichte

[11] 4,229,638

[45] * Oct. 21, 1980

[54] UNITIZED ROTARY ROCK BIT

[75] Inventor: Carl L. Lichte, Dallas, Tex.

[73] Assignee: Dresser Industries, Inc., Dallas, Tex.

[*] Notice: The portion of the term of this patent subsequent to Sep. 23, 1992, has been disclaimed.

[21] Appl. No.: 564,014

[22] Filed: Apr. 1, 1975

Related U.S. Application Data

[62] Division of Ser. No. 409,207, Oct. 24, 1973, abandoned.

[51] Int. Cl.² ............................................. B23K 15/00
[52] U.S. Cl. ............................... 219/121 EM; 269/63;
228/196; 175/375; 76/108 A; 228/182
[58] Field of Search ................. 219/121 EB, 121 EM;
269/63, 71; 279/1.5, 5, 110, 112; 76/108 R, 108
A; 228/182, 196, 212

[56] References Cited

U.S. PATENT DOCUMENTS

| 2,225,273 | 12/1940 | Jacobs | 279/112 X |
|---|---|---|---|
| 2,831,661 | 4/1958 | Brown | 175/340 |
| 2,901,223 | 8/1959 | Scott | 175/340 X |
| 2,925,659 | 2/1960 | Lovely | 33/168 R |
| 3,518,400 | 6/1970 | Gallivan | 219/121 EM |
| 3,907,191 | 9/1975 | Lichte | 228/182 |

OTHER PUBLICATIONS

*Metals Handbook*, vol. 6, 8th ed. 1971, pp. 519-523.
*Electron Beam Welding*, M. J. Fletcher, 1971, pp. 26-29.

*Primary Examiner*—B. A. Reynolds
*Assistant Examiner*—M. H. Paschall
*Attorney, Agent, or Firm*—Fred A. Winans; Eddie E. Scott

[57] ABSTRACT

A rotary rock bit is formed from at least two individual segments. The individual segments are positioned together and aligned in the proper position for the final assembled bit. The seams between the individual segments are in the form of square-butt type joints and the adjoining segments have surface areas that are in abutting relationship to each other. A beam of energy such as an electron beam or a laser beam is directed into the seams. Relative movement between the beam and segments of the bit causes the beam to traverse the seams and join said individual segments together throughout substantially all of said abutting surface areas.

3 Claims, 6 Drawing Figures

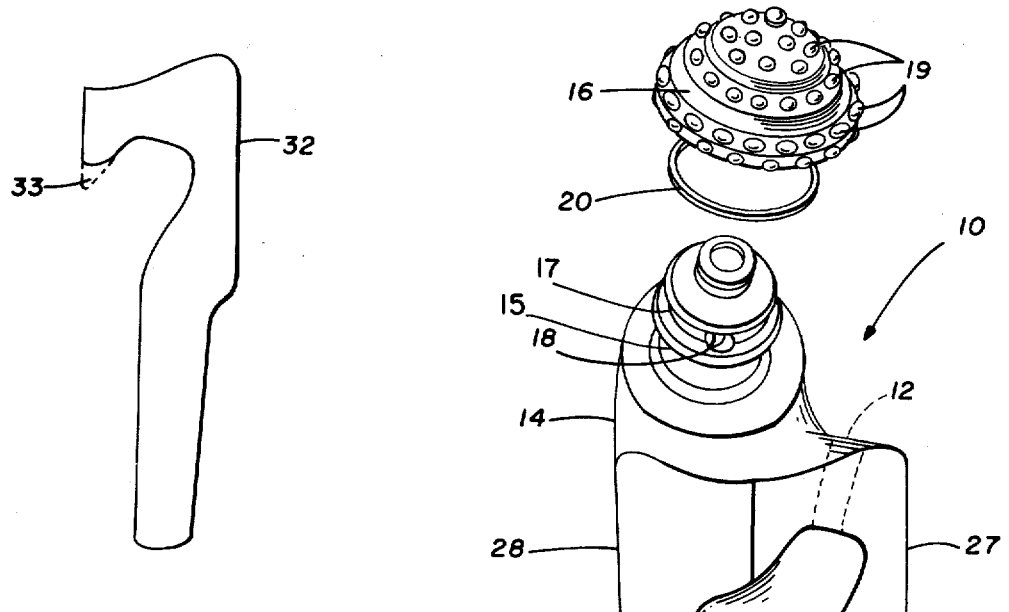
FIG. 3
FIG. 1
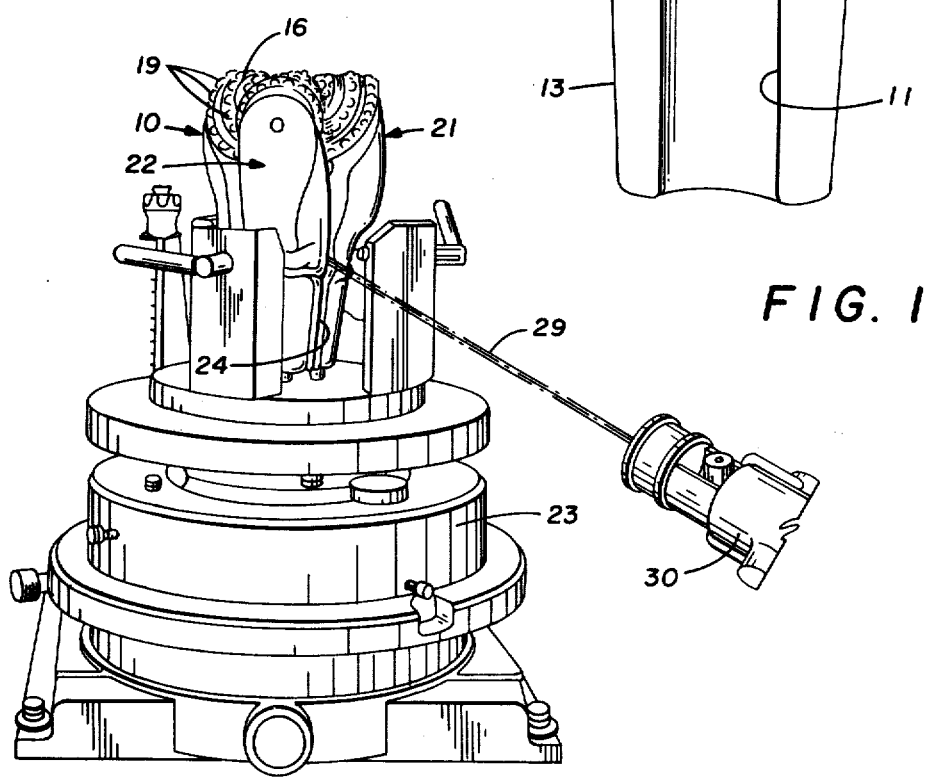
FIG. 2

UNITIZED ROTARY ROCK BIT

CROSS REFERENCE TO RELATED APPLICATIONS

This is a division of U.S. application Ser. No. 409,207, filed Oct. 24, 1973 for UNITIZED ROTARY ROCK BIT, now abandoned. Applicant in this application is also the applicant in the following applications: U.S. application Ser. No. 577,828, filed May 15, 1975 for UNITIZED ROTARY ROCK BIT now U.S. Pat. No. 3,987,859, said application being a continuation of U.S. application Ser. No. 409,207, filed Oct. 24, 1973; U.S. application Ser. No. 409,208, filed Oct. 24, 1973, now U.S. Pat. No. 3,907,191 for A METHOD OF CONSTRUCTING A ROTARY ROCK BIT; U.S. application Ser. No. 409,209, filed Oct. 24, 1973 for POSITIONING FIXTURE FOR ROCK BIT WELDING, now abandoned; U.S. application Ser. No. 581,997, filed May 29, 1975 for POSITIONING FIXTURE FOR ROCK BIT WELDING, said application being a continuation of U.S. application Ser. No. 409,209, filed Oct. 24, 1973, and U.S. application Ser. No. 574,228, filed May 5, 1974 for POSITIONING FIXTURE FOR ROCK BIT WELDING, said application being a continuation-in-part of U.S. application Ser. No. 409,209, filed Oct. 24, 1973.

BACKGROUND OF THE INVENTION

The present invention relates to the earth boring art and more particularly to a rotary rock bit constructed from a multiplicity of individual segments that are joined together using a beam of energy. A rotary rock bit in general consists of a main bit body adapted to be connected to a rotary drill string. Cutter means connected to the main bit body contact the formation during the drilling operation to form the desired borehole. The present invention provides a rotary rock bit that is constructed from separate individual segments. The segments are joined together using a beam of energy.

The rotary rock bit must operate under extremely harsh environmental conditions and must effectively disintegrate very hard formations to produce the desired borehole. The gage size of the bits must be precise. Variation in the gage size of bits has been a problem in the prior art. In some operations the bit must pass through casing with a minimum clearance. In other operations it is necessary for the bit to pass through bored and still open holes which may be within a few thousandths of an inch of the gage size of the bit. If the gage size of the bits varies during the manufacturing process, the bits will encounter problems during the drilling operation.

The prior art methods of manufacturing rotary rock bits require the use of shims to size the bits to the proper gage size. The present invention allows the bits to be manufactured with an accurate and uniform gage size without the use of shims. During the construction of a prior art rotary rock bit a substantial amount of heat is generated when the separate segments of the bit are welded together. It is necessary to cool the prior art bits to prevent tempering of steel components and heat damage to rubber components. The excessive heat creates a risk of a change in temper of the metal of the rock bit, thereby creating the danger of a premature failure of the metal during the drilling operation. Since the rock bit often includes rubber or synthetic parts, any excessive heating in the vicinity of said parts may cause a weakening or destruction of said parts. It has been necessary to use dowels between the segments of prior art bits to insure proper alignment.

The prior art method of manufacturing rotary rock bits consists of forming a weld groove between adjacent segments of the bit and filling the weld groove with a weld deposit by a welding process. Surfaces on adjoining segments are in adjacent relationship but the surfaces are not joined together and the joining of the segments is through the weld deposit. The cross sectional shape of the prior art weld is an irregular many sided polygon. An excessive amount of weld deposit is produced during the welding of prior art bits and the excessive amount of weld deposit often results in warpage of the bit body. The excessive weld deposit also creates the danger of the lubrication system and the bearing system being contaminated during the manufacturing process by debris from the welding process. The weld deposit is not as hard as the body segments, thereby creating fatigue problems.

When the individual segments of the bit body are to be joined together, they must be accurately positioned during the welding process. If the individual segments are not properly positioned, the gage size of the bit will not be accurate. When a beam of energy is used to join the individual segments of the bit, the individual segments must be accurately aligned with the beam during the welding process. The joining of the individual segments of the bit body in accordance with the present invention insures that the gage size of the bit will be accurate.

An illustration of the problems created with prior art manufacturing processes will be presented with reference to a rotary cone rock bit. A rotary cone rock bit includes at least one rotatable cutter mounted on a bearing pin extending from the main bit body. Bearings are provided between the cutter and the bearing pin to promote rotation of the cutter and means are provided on the outer surface of the cutter for disintegrating the formations as the bit and cutter rotate and move through the formation. A sufficient supply of lubricant must be provided to the bearings throughout the lifetime of the bit. The lubricant is maintained within the bearing area by a flexible rubber seal between the cutter and the bearing pin. Any excessive heating of the bit will damage the rubber seal and/or the lubricant. If the bit body is not constructed to a precise gage size, the bits will encounter difficulties when they are moved through casing having a minimum clearance or through a borehole with minimum clearance. Excessive weld deposits may result in warpage of the bit and a resulting inaccurate gage size.

DESCRIPTION OF PRIOR ART

In U.S. Pat. No. 2,807,444 to W. H. Reifschneider, patented Sept. 24, 1957, a rotary earth boring drill is shown and claimed in which the bit head is formed of a plurality of arcuate segments each of said segments being asymmetric and comprising a body portion having a downwardly extending leg and a downwardly extending hollow boss in side-by-side relation thereon, there being a passage communicating between the interior of the bit head and bores of the bosses.

In U.S. Pat. No. 2,831,661 to G. R. Brown, patented Apr. 22, 1958, a drill bit consisting of three segmental elements which are adapted to fit together to constitute a bit as shown. After forging, the segmental elements are machined to afford accurately meeting surfaces when the elements are assembled together. The margins which represent the meeting of the segments are given a chamfer for providing a weld groove. The three segmental elements are assembled in a jig and welding is carried out along the groove.

In U.S. Pat. No. 2,778,926 to W. H. Schneider, patented Jan. 22, 1957, a method for welding and soldering by bombarding by electrons the engaging surfaces of two parts to be connected is shown. The method disclosed shows a system for soldering, welding, or sintering suitable materials by heating the parts to be connected with a beam of electrons.

SUMMARY OF THE INVENTION

The present invention provides a unitized rotary rock bit. The temper of the metal of the rock bit is not altered by excessive heating and the less heat resistant elements of the rock bit are prevented from being damaged by excessive heat. A multiplicity of individual segments of the rock bit are positioned together and aligned in the proper position for the final assembled bit. The adjoining segments have surface areas that are in abutting relationship to each other. The alignment of the individual segments of the rock bit provides seams between the individual segments. The seams are in the form of square-butt type joints. A beam of energy is directed into said seams to join said individual segments together. The beam and the individual segments of the rock bit are moved relative to one another causing the beam to travel along said seams in the plane of the seams joining said individual segments together throughout substantially all of said abutting surface areas.

It is therefore an object of the present invention to construct a rock bit that is not damaged or altered by excessive heat during the construction process.

It is a further object of the present invention to provide a method of constructing rock bits that will produce bits with accurate gage diameters.

It is a still further object of the present invention to provide a rock bit that includes a substantial fused area between segments and greater strength and rigidity.

It is a still further object of the present invention to provide a method of constructing rock bits that will provide substantially 100% joining of segments without abrupt hardness gradients across heat affected zones.

It is a still further object of the present invention to provide a method of constructing rock bits that results in clean assemblies emerging from the construction process.

It is a still further object of the present invention to provide greater reliability and reliable repeatability in the construction of rotary rock bits.

It is a still further object of the present invention to provide precise control of weld parameters during the welding of rotary rock bits.

The above and other objects and advantages of the present invention will become apparent from a consideration of the following detailed description of the invention when taken in conjunction with the drawings.

BRIEF DESCRIPTION OF THE DRAWINGS

FIG. 1 shows an individual segment of a rotary rock bit.

FIG. 2 shows three individual segments of a rotary rock bit positioned together for welding.

FIG. 3 shows the surface area that is joined by the method of the present invention.

DETAILED DESCRIPTION OF THE INVENTION

Figure 4:
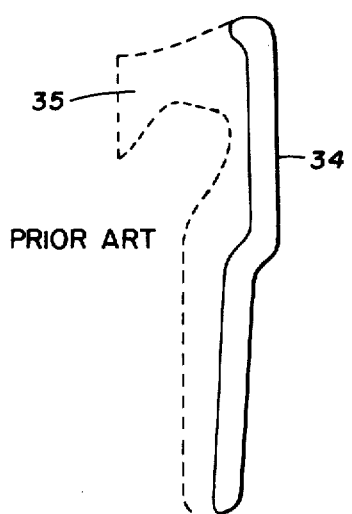
FIG. 4 shows the weld area of prior art rotary rock bits.

Referring now to FIG. 1, an individual segment of a bit constituting one third of a rotary rock bit is shown in an exploded view. The segment is generally designated by the reference number 10. The individual segment 10 constitutes one arm of a three cone rotary rock bit. A central passage 11 is located in the rock bit to allow drilling mud to be transmitted through the rock bit to the bottom of the well bore for removing cuttings and cooling the bit. The drilling fluid is channeled through the central passageway 11 and exits from the bit through nozzles, one nozzle 12 being shown in FIG. 1. The bit is adapted to be connected to a rotary drill string by a threaded connection that will be provided by the threading of the outside surface 13.

The segment 10 of the bit includes an arm 14 terminating in a bearing pin 15. A rotatable cone cutter 16 is positioned upon the bearing pin 15 and adapted to rotate thereon. Bearings (not specifically shown) between the bearing pin 15 and cutter 16 facilitate rotation of cutter 16. The bearings include a series of ball bearings that are positioned in the ball bearing race 17 on the bearing pin 15. After the cone cutter 16 is in place on the bearing pin 15, the ball bearings are loaded into position between a ball bearing race (not shown) on the inside of the cutter 16 and the ball bearing race 17 on the bearing pin 15 through a hole 18 in the arm 14. Once the ball bearings are in place and the cone cutter 16 is locked on the bearing pin 15, the hole 18 is plugged to insure that the ball bearings will not be lost during operation of the bit.

A multiplicity of inserts 19 are located on the exterior surface of the cutter 16 for disintegrating the formations as the bit is rotated and moved through the formations. In order to provide the bearings with a long life, a lubricant is maintained within the area between the cone 16 and the bearing pin 15. A rubber seal 20 is positioned between the arm 14 and the cone 16 to insure that the lubricant remains within the bearing area.

Referring now to FIG. 2, the segment 10 is shown positioned together with two other individual segments 21 and 22. The segments 10, 21, and 22 are aligned in the proper position for the final bit. The segments are positioned within a fixture 23 that allows the seams 24 between the individual segments of the rock bit to be properly positioned for the joining process. A beam 29 of high velocity electrons is directed into the seams 24 between the individual segments of the rock bit to fuse the segments together and produce a truly unitized rock bit.

The beam of electrons is produced by an electron beam gun 30 and the beam 29 is caused to move in the plane of the seams 24 by relative movement between the segments 10, 21, 22 and the electron beam gun 30. Because of the high intensity of the electron beam (10 KW/mm$^2$) and its high power capability (60 KW) the width of the area acted on between the segments is much narrower than that found in prior art rock bits. In addition, the electron beam gun produces a beam that penetrates substantially throughout the area to be joined. The energy from the electron beam is applied rapidly thereby preventing heat buildup and reducing the danger of damaging the portions of the rock bit that have a low tolerance to heat such as the rubber seal 20 and the lubricant. The segments 10, 21, and 22 of the rock bit fit together to form a square-butt type joint rather than the V-groove or the J-groove joints that were required in prior art rotary rock bits. The electron beam does not add material to produce a buildup of deposit along the seams and there is very little if any warpage.

Referring again to FIG. 1, it will be noted that the faces 25 and 26 are flat and adapted to be positioned in abutting relationship to the other segments that make up the rock bit. The edges 27 and 28 of the faces 25 and 26, respectively, are substantially square and are not chamfered or beveled as in prior art rock bits.

The method of the present invention provides a significantly large area that is joined thereby providing greater strength and rigidity in the bit. A comparison was made of the area joined on the individual segments used in the construction of a rock bit by the method of the present invention and the weld area of individual segments used in the construction of a rock bit by a typical prior art method. The area measured corresponds to the portion joined. The following table shows that a substantially greater area is joined by the method of the present invention:

| Method of the Present Invention | | Method of the Prior Art | |
|---|---|---|---|
| Segment | Area Joined | Segment | Welded Area |
| 80036 Special #1 | 11.29 in$^2$ | 80036 Standard #4 | 5.06 in$^2$ |
| 80036 Special #2 | 11.31 in$^2$ | 80036 Standard #5 | 4.27 in$^2$ |
| 80036 Special #3 | 10.60 in$^2$ | 80036 Standard #6 | 4.29 in$^2$ |

Referring now to FIG. 3, the size of the areas of adjacent segments that are joined by the method of the present invention is illustrated. The face 25 shown in FIG. 1 will be placed in abutting relationship to an adjacent face on the next adjacent segment 21. Substantially the entire surface areas will be joined by the method of the present invention. The outline 32 shows the area that will be joined by the method of the present invention. The only area that will not be joined is the area 33. It will be appreciated that substantially the entire area of the abutting surfaces will be joined by the method of the present invention.

Referring now to FIG. 4, the weld area of a prior art rotary rock bit is shown. The outline 34 shows the area of the weld. A weld groove is formed between the adjacent segments and the weld groove is filled with a weld deposit by a welding process. The resulting weld is only in the area shown by the outline 34. The area that will not be joined is the area 35. It will be appreciated that a substantially larger area will be joined by the present invention.

The method of the present invention prevents contamination of the bearing and lubrication systems of the bit during the manufacturing process. The splatter from welding by the prior art method creates a constant hazard of the bearing and the lubrication systems being contaminated. Since a substantial weld deposit is formed by the prior art method, particles of the weld deposit may contaminate the bearing and lubrication systems.

Figure 5:
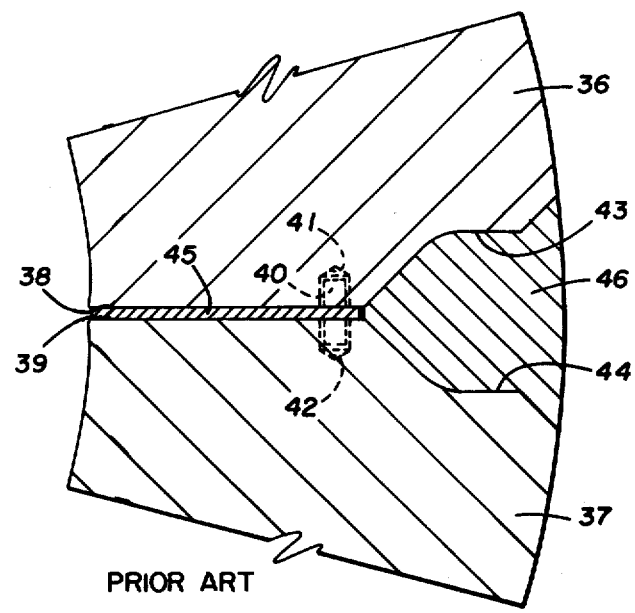
FIG. 5 shows a horizontal section of a prior art weld.

Referring now to FIG. 5, a horizontal sectional view of a prior art weld is shown. The segment 36 is positioned proximate the segment 37. A face 38 on segment 36 is opposite a face 39 on segment 37. A dowel 40 extends into a hole 41 in segment 36 and into a hole 42 in segment 37. The dowel 40 is used to align the segments of the bit in the proper position for welding. The segment 36 includes a section 43 that will, when combined with the matching section 44 on segment 37, form a weld groove. As previously explained, the bit must have an accurate gage diameter. In order to size the bits to the proper gage diameter, a shim 45 is positioned between the faces 38 and 39. Various numbers of shims will be required in the bit depending upon the adjustment needed to bring the bit to the proper gage size.

The weld groove formed by the sections 43 and 44 is filled with a weld deposit 46. It will be noted that the faces 38 and 39 are not connected by a weld and that the segments 36 and 37 are joined solely by the weld deposit 46. The cross section of the weld deposit 46 is in the form of an irregular multi-sided polygon. This shape of weld is subjected to complicated stress forces and the fatigue life is shorter than fatigue life of the weld of the present invention. The weld deposit is softer than the metal of the segments 36 and 37. For example, the hardness of the weld deposit 46 will generally be within the range of 15-20 Rockwell C, whereas the hardness of the segments 36 and 37 will generally be within the range of 25-35 Rockwell C. The softer weld deposit 36 is therefore not as strong as the adjacent segments 36 and 37.

Figure 6:
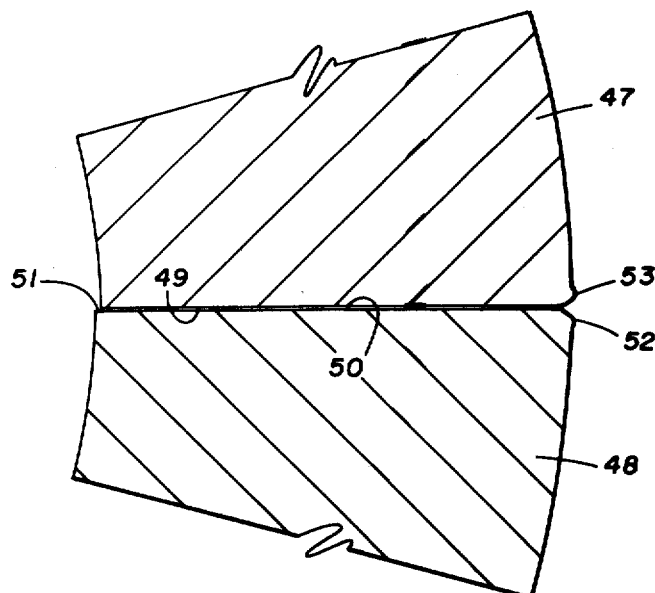
FIG. 6 shows a horizontal section of a weld of the present invention.

Referring now to FIG. 6, a horizontal sectional view of a weld of the present invention is shown. The segment 47 is positioned next to the segment 48. A face 49 on segment 47 is in abutting relationship to a face 50 on segment 48. The segments 47 and 48 are joined throughout substantially all of said faces 49 and 50 as previously explained. Ridges 52 and 53 are formed on the segments 47 and 48 respectively by the flash left from the forging of segments 47 and 48. Shims are not used to size the bit to the proper gage size. Instead of using dowels to position the segments 47 and 48, the segments 47 and 48 are moved relative to one another to bring the bit to the proper gage size. For example, the upper portions of segments 47 and 48 are moved slightly outward. A portion 51 of face 50 will be exposed by the sliding movement of faces 49 and 50 when the bit is being brought to the proper gage size. It has been found desirable to maintain the faces 49 and 50 precisely adjacent each other near the lower threaded end of the bit whereas the small sliding movement of the faces 49 and 50 is accomplished near the upper portion of the body of the bit.

A small heat affected zone will exist on each side of faces 49 and 50; however, this heat affected zone will be even harder than the segments 47 and 48. For example, this heat affected zone or weld area will have a hardness generally within the range of 35-45 Rockwell C. This is compared to the segments 47 and 48 that will generally have a hardness in the range of 25-35 Rockwell C. It will therefore be appreciated that the bit construct in accordance with the present invention is substantially stronger than the bits of the prior art. It will also be noted that there is less hardness variation between the weld zone and the segments of the bit of the present invention as compared to the weld and the segments of the prior art bit. This can also be described as the weld of the present invention having a substantially less notch effect than the weld of the prior art.

The present invention provides greater reliability and reliable repeatability because a greater number of the manufacturing operations can be done by machine as compared to the prior art. The human factor, of course, results in substantial variation. The present invention also provides precise control of the weld parameters throughout the length of the weld.

The embodiments of the invention in which an exclusive property or privilege is claimed are defined as follows:

1. A reliable method for repeatedly constructing three cone rotary rock bits that will have a gate diameter of an accurate gage size, comprising the steps of:

providing each of said segments with substantially plane faces and a gage cutting structure;

positioning said three individual segments together with a plane face of each segment abutting a plane face on another segment so that said abutting faces are slightly out of alignment and not precisely coterminous, placing said gage cutting structure at said gage diameter thereby providing said rotary rock bit with an accurate gage size, said three individual rock bit segments being in the proper position for the final assembled bit with seams between the individual segments;

aligning said seams with an electron beam gun so that the plane of each seam is aligned with a beam of electrons produced by said electron beam gun;

directing said beam of electrons into said seams; and causing relative movement of said beam of electrons and said individual segments in the plane of said seams to join said individual segments together by an electron beam weld.

2. A reliable method for repeatedly constructing three cone rotary rock bits having a gage diameter of a precise gage size, comprising the steps of:

constructing said segments with a first segment including a first cutter and a pair of faces;

a second segment including a second cutter and a pair of faces; and a third segment including a third cutter and a pair of faces;

positioning said three segments together with a face on said first segment abutting a face on said second segment, a face on said second segment abutting a face on said third segment, and a face on said third segment abutting a face on said first segment thereby forming seams between said segments, said segments positioned so that said faces are slightly out of alignment and not precisely coterminous with each other placing said first, second and third cutters at the gage diameter of a precise gage size;

aligning said seams with an electron beam gun so that each seam will be in alignment with a beam of electrons produced by said electron beam gun;

directing said beam of electrons into said seams; and causing relative movement of said beam and said individual segments to join said individual segments together by an electron beam weld.

3. A reliable method for repeatedly constructing three cone rotary rock bits having gage diameters of a proper gage size, each of said bits being constructed from three individual rock bit segments, each of said segments having a cutter mounted on a bearing pin with said cutter having a gage cutting structure for cutting the gage diameter of said borehole and each of said segments having a pair of longitudinal faces, comprising the steps of:

constructing said segments with a first segment including an arm that terminates in a first bearing pin, a first cutter mounted upon said first bearing pin, and a pair of longitudinal faces, said first cutter having a first gage cutting structure;

a second segment including an arm that terminates in a second bearing pin, a second cutter mounted upon said second bearing pin, and a pair of longitudinal faces, said second cutter having a second gage cutting structure;

a third segment including an arm that terminates in a third bearing pin, a third cutter mounted upon said third bearing pin, and a pair of longitudinal faces, said third cutter having a third gage cutting structure;

positioning said three individual segments together with a longitudinal face on said first segment abutting a longitudinal face on said second segment, a longitudinal face on said second segment abutting a longitudinal face on said third segment, and a longitudinal face on said third segment abutting a longitudinal face on said first segment thereby forming seams between segments, said segments moved so that said longitudinal faces are slightly out of alignment with each other placing said first, second and third gage cutting structures of said first, second and third cutters at the proper gage diameter;

aligning said seams with an electron beam gun so that each seam is aligned with the plane of a beam produced by said electron beam gun;

directing a beam of electrons into said seams; and causing relative movement of said beam and said individual segments to join said individual segments together by an electron beam weld.

* * * * *